United States Patent [19]
McDaniel et al.

[11] 4,444,962
[45] Apr. 24, 1984

[54] POLYMERIZATION PROCESS USING CATALYSTS WITH ACID GELLED ALUMINUM PHOSPHATE BASE

[75] Inventors: Max P. McDaniel; Marvin M. Johnson, both of Bartlesville, Okla.

[73] Assignee: Phillips Petroleum Company, Bartlesville, Okla.

[21] Appl. No.: 423,599

[22] Filed: Sep. 27, 1982

Related U.S. Application Data

[62] Division of Ser. No. 221,747, Dec. 31, 1980, Pat. No. 4,364,854.

[51] Int. Cl.$^3$ ............................ C08F 4/02; C08F 4/20; C08F 4/24
[52] U.S. Cl. ...................................... 526/95; 502/154; 502/209; 502/210; 423/308; 423/311; 526/105; 526/106; 526/352
[58] Field of Search ........................ 526/95, 105, 106

[56] References Cited

U.S. PATENT DOCUMENTS

| | | | |
|---|---|---|---|
| 2,930,789 | 3/1960 | Kerber et al. | 526/106 |
| 3,271,299 | 9/1966 | Kearby | 208/114 |
| 4,080,311 | 3/1978 | Kehl | 252/437 |
| 4,147,758 | 4/1979 | Adrian et al. | 423/315 |
| 4,219,444 | 8/1980 | Hill et al. | 526/106 |

FOREIGN PATENT DOCUMENTS 949011  2/1964  United Kingdom .

Primary Examiner—Stanford M. Levin

[57] ABSTRACT

Aluminum orthophosphate is prepared by combining a source of phosphate ions with an aluminum salt to form a concentrated mass, combining with sufficient neutralizing agent to partially neutralize, and aging until gellation occurs. The resulting aluminum phosphate is particularly suited for use as a base for a chromium olefin polymerization catalyst.

17 Claims, No Drawings

POLYMERIZATION PROCESS USING CATALYSTS WITH ACID GELLED ALUMINUM PHOSPHATE BASE

CROSS REFERENCE TO RELATED APPLICATION

This is a divisional of copending application Ser. No. 221,747, filed Dec. 31, 1980, U.S. Pat. No. 4,364,854.

BACKGROUND OF THE INVENTION

This invention relates to the production of aluminum phosphate. The production of aluminum phosphate by combining aqueous solutions of an aluminum salt and a source of phosphate ions, such as phosphoric acid, followed by neutralization with a base to give a precipitate or a true hydrogel is well known in the art. The resulting phosphate has been disclosed to have several utilities including use as a support for chromium oxide catalysts. There is considerable progression in the art with regard to the preparation of aluminum phosphate catalysts with the newer art suggesting forming the gel at a relatively high pH in order to obtain a higher surface area product. Generally, the art suggests converting the hydrogel to a xerogel by means of simple oven or tray drying or spray drying although it is incidentally taught in the art to wash with a water miscible liquid, such as an alcohol.

At least as it relates to a base for chromium catalysts, even the most advanced teachings of the prior art still do not produce a base which has found favor as a chromium catalyst support for olefin polymerization. Thus, chromium catalysts are generally supported on silica-containing bases similar to those used decades ago when the chromium catalyzed polymerization of olefin polymers first became commercial.

SUMMARY OF THE INVENTION

It is an object of this invention to provide a novel method of producing aluminum phosphate;

It is a further object of this invention to provide an olefin polymerization catalyst capable of high productivity;

It is yet a further object of this invention to provide an olefin polymerization catalyst which does not fall off in activity during polymerization of a monomer;

It is a further object of this invention to produce a superior aluminum phosphate for use as a base for chromium or vanadium catalyzed olefin polymerization; and It is still yet a further object of this invention to provide a simplified method of producing aluminum phosphate.

In accordance with this invention, a source of orthophosphate ions is combined with an aluminum salt to form a concentrated mass, thereafter this mass is combined with a neutralizing agent for partial neutralization and the resulting composition aged until gellation occurs.

DESCRIPTION OF THE PREFERRED EMBODIMENTS

The aluminum phosphate gel is formed at a strongly acid pH from a concentrated mass of reactants comprising aluminum ions from an aluminum salt and a source of orthophosphate ions. This is done by using an aluminum salt which will melt, preferably one which will melt at or below the boiling point of water or by forming a syrup of a water soluble aluminum salt and a very small amount of water. In either event, the concentrated mass is partially neutralized and aged.

Generally, hydrated aluminum salts such as hydrated aluminum nitrate are most susceptible to being melted and thus are preferred as the source of aluminum ions for the melt method. Aluminum bromide and hydrated aluminum bromate can also be used as can, broadly, any aluminum salt which will melt. If desired, up to 20 weight percent additional water can be present based on the weight of the aluminum salt or there can be no water except the water, if any, from the water of hydration and the water, if any, from the base used in the subsequent neutralization, i.e., no extraneous water is added. By additional water is meant water actually added as water and does not count the water, if any, from the water of hydration of the ingredients and/or the water, if any, from the base. There may be some advantage to adding 1 to 15 weight percent water based on the weight of the aluminum salt, however. The percentages of water are based on the actual weight of the aluminum salt including any water of hydration.

Alternatively, an aluminum salt which will not necessarily melt but which will dissolve in water enough to form a syrup in up to 200 weight percent or less, preferably 40 weight percent, or less, water based on the weight of the aluminum salt can be used. Generally, 5 to 40 weight percent water is used based on the weight of the aluminum salt when a syrup is formed. Aluminum sulfate, for instance is ideally suited for use in this embodiment of the invention. Aluminum nitrate is also suitable as is any water soluble aluminum salt.

There is an interrelation between the amount of water used, if any, and the degree of neutralization. Less water or more neutralization agent gives faster gelation, while more water and less neutralization agent give slower gelation. Hence, if the upper end of the broad range on water content is approached, the extent of neutralization must be strictly within the 60 to 70 percent range set out hereinafter, (at least so far as the lower end of the range is concerned), preferably 65 to 70 percent. If no water, or an amount within the preferred range of 5 to 40 percent is used, then the entire 60 to 70 percent neutralization range is quite satisfactory with possibly even a little leeway on each end thereof. Generally, no gel will form at 56 percent neutralization (56 percent of the stoichiometric amount of neutralizing agent added) and generally gelation will occur spontaneously at about 72 percent so these extremes must be avoided. With these guidelines, it is easy to use the right combination of water, if any, and percentage neutralization to give gelation on aging for 1 minute to 48 hours, preferably 5 minutes to 10 hours, more preferably 10 minutes to 3 hours.

By complete (theoretical) neutralization is meant that the final pH is 7. The range of about 60 to 70 percent neutralization is based on the use of aluminum nitrate, monobasic ammonium phosphate and a P/Al ratio of 0.8. This would vary depending on the aluminum salt used, the phosphorus to aluminum ratio and would, of course vary in a manner easily calculated if dibasic ammonium phosphate or phosphoric acid were used. That is, if dibasic ammonium phosphate is used, then one less mole of base per mole of phosphate is needed and if phosphoric acid is used one more mole of base per mole of phosphate is needed. In any event enough is used to give a pH below 4 and to cause gelation after a reasonable period of aging.

The source of the phosphate ions can be any source of orthophosphate ions and is generally orthophosphoric acid or orthophosphates, such as monobasic ammonium phosphate or dibasic ammonium phosphate or mixtures thereof. Of the ammonium phosphates, the monobasic is preferred.

The temperature, if a melt is used, can be any temperature at or above which the aluminum salt chosen will melt. The reaction can be carried out in any atmosphere including air or can be carried out under an inert atmosphere for instance. Generally, temperatures of 65°–200° C., preferably 65°–100° C. are used. Although, since the preferred aluminum salt is $Al(NO_3)_3.9H_2O$ which melts at 73° C., the most preferred temperatures based on the use of this aluminum salt is about 80° C.±5° C. If a very concentrated syrup of a water soluble aluminum salt and water are used, any temperature up to the boiling point of the syrup under the conditions employed can be used, preferably about 20° to about 150° C.

Since very little water, if any, is present during the formation of the aluminum phosphate, it is not necessary to utilize azeotropic distillation or washing with a normally liquid water miscible organic solvent to remove the water gently although azeotropic distillation or washing with a normally liquid water miscible organic solvent is the preferred method of removing water. Also, the concentrated mass gives a gel with greater physical strength. Finally, olefin polymerization chromium catalysts supported on such a base have higher activity and less tendency for activity to drop off during polymerization of the monomer.

It has been found that low pore volume hydrogels usually give the highest porosity xerogels after drying because they have superior internal strength to withstand the compression of surface tension during the drying. Thus, if the hydrogel occupies 10 cm$^3$ per gram of aluminum phosphate or less, generally 3 to 6 cm$^3$ per gram, it will give a xerogel having improved porosity for a catalyst base than will a hydrogel conventionally prepared from a dilute aqueous solution which will occupy about 11 cm$^3$ per gram or more. By 6 cm$^3$ per gram, for instance is meant that each gram of any aluminum phosphate occupied 6 cm$^3$ in the hydrogel stage. Thus, another way to define the concentrated mass is that the aluminum salt melt/phosphate mass or aluminum syrup/phosphate mass is sufficiently concentrated so as to give a hydrogel which occupies 3 to 6 cm$^3$ per gram. The theoretical minimum if no extraneous water is added is about 3 cm$^3$ per gram with aluminum nitrate.

The following four representative calculations of the volume per gram of concentrated mass of invention preparations and the two calculations showing the same mathematics for a dilute system is presented to facilitate an understanding of the meaning of the concept of the final dry aluminum phosphate having occupied a relatively small number of cm$^3$ per gram in the prior hydrogel stage. These calculations are based on the use of one quarter mole of $Al(NO_3)_3.9H_2O$ and about one-fifth mole monobasic ammonium phosphate plus sufficient $Cr(NO_3)_3.9H_2O$ to give one weight percent chromium in the final catalyst. The slight disparity between the mole ratio of aluminum nitrate to aluminum phosphate reflects the desire to have a phosphorus to aluminum ratio of 0.8 in the final phosphate. It has been found experimentally that this amount of material when the aluminum nitrate is melted and the other ingredients added thereto occupies about 90 cm$^3$. If it is gelled by partial neutralization with ammonia gas, the ammonia gas will add no appreciable amount to the volume and the volume of the gel is approximately equal to the volume of the melt. This, then, gives one quarter mole of low phosphorus aluminum phosphate which weighs 27 grams when washed of salts and dried. As previously set out, this amount of material in the hydrogel stage occupied 90 cm$^3$. Ninety cm$^3$ divided by 27 g is 3.3 cm$^3$ per gram representing approximately the theoretical minimum space which one gram of dry aluminum phosphate can occupy when in the hydrogel stage. This might vary slightly if other proportions or types of starting ingredients were used.

More typically, however, neutralization of the concentrated mass will be carried out by partially neutralizing it with concentrated ammonium hydroxide. Complete neutralization would require 46 cm$^3$ of ammonium hydroxide per one quarter mole. Partial neutralization with, for instance, two-thirds of this would require 31 cm$^3$. This then will add 31 cm$^3$ to the 90 cm$^3$ volume obtained with no water added in the neutralization to give a total of 121 cm$^3$ which will still produce the same 27 grams of ammonium phosphate when washed of salts and dried. One hundred twenty-one cm$^3$ divided by 27 g equals 4.5 which is the volume in cm$^3$ occupied in the hydrogel state by one gram of final dry ammonium phosphate in this preparation. By concentrated ammonium hydroxide is meant an aqueous solution containing about 30 weight percent ammonia.

If a very small amount of water, for instance 10 cm$^3$ were added to the melt, this would give a total volume of 100 cm$^3$ instead of 90 cm$^3$. Then on adding 31 cm$^3$ of ammonium hydroxide, the total volume would be 131 cm$^3$ which would still product 27 g of dry ammonium phosphate. One hundred thirty-one cm$^3$ divided by 27 g equals 4.9 cc of hydrogel which give one gram of final dry aluminum phosphate.

Even if 40 percent water based on the aluminum salt is used, this is still a very small amount of water overall. For instance, 40 percent of 93 grams, the weight of one quarter mole $Al(NO_3)_3.9H_2O$ is only 37 cm$^3$ which added to 121 cm$^3$ gives a total volume of hydrogel of 158 cm$^3$, which divided by 27 grams is 5.9 cm$^3$ per gram.

In the conventional dilute systems, typically 0.2 to 2 liters of water are utilized with one quarter mole of ingredients. Taking the lower end of this typical preparation of 0.2 liter, this added to the 136 cm$^3$ obtained when no water is added (the prior art would use complete neutralization which would require 36 cm$^3$ not 31 cm$^3$) would give 336 cm$^3$ total volume divided by the 27 grams of product would give about 12 cm$^3$ per gram. A more typical conventional preparation utilizing about one liter of water with one quarter mole of ingredients would give 1136 cm$^3$ which divided by 27 cm$^3$ would be 42 cm$^3$ per gram. Thus, even the largest amount of water contemplated in this invention, 200 percent based on the aluminum salt is a relatively small amount.

While low phosphorus aluminum phosphate may be thought of for convenience as a mixture of alumina and aluminum phosphate, it is not, but rather is a gel with some of the trivalent $PO_4$ groups replaced with trivalent $AlO_3$ groups.

It may be desirable in some instances to coprecipitate other materials such as titania with the phosphate or have other materials present during the gellation and/or activation. For instance, if the purpose is to produce a support for a chromium catalyst, the chromium compound such as chromium nitrate or $CrO_3$ or chromium acetate can be introduced with the reactants. Similarly, a silicon compound, such as silicon tetraethoxide can be coprecipitated with the phosphate.

When the object is to produce a catalyst base, it is frequently preferred that a small amount of a boron compound, such as boric acid, be introduced into the concentrated mass to be coprecipitated with the aluminum phosphate. Other suitable boron compounds include borates, such as ammonium borate. By coprecipitated as it relates to the boron compound, it is meant that the aluminum phosphate is formed into a true hydrogel in the presence of the boron compound. It is not known to what extent the borate becomes incorporated in the hydrogel structure. The amount of boron compound present when the aluminum phosphate is gelled can vary widely but it is generally used in an amount so as to give 1 to 30 mole percent boron compound based on the moles of phosphate.

The gellation must be brought about by partial neutralization followed by aging. This can be carried out either by adding the acid phase, i.e., the aluminum salt/phosphate combination, to a neutralizing agent phase or vice versa (or by adding both to a third vessel). One suitable practice is to slowly introduce the neutralizing agent into the acid phase with stirring.

As stated above, the neutralization must be only partial neutralization so that gellation does not occur immediately but does occur after a reasonable aging time. Surprisingly, this is a relatively narrow range. While gellation can be brought about at a pH anywhere from 4 to 10 or more as is known in the prior art, if the pH is low, i.e., below 5, a poor quality gel forms. However, if about 60 to 70 mole percent of the theoretical amount of neutralizing agent is added, based on the exact amount needed for complete neutralization using monobasic ammonium phosphate, and the composition is allowed to sit, gellation occurs under acid conditions but without the bad characteristics associated in the prior art with gelling at an acid pH. Indeed, the results are superior even to gelling at an alkaline pH. The aging can be carried out at any convenient temperature from 0° C. to 100° C., for instance, and in any nondeleterious atmosphere. For convenience and economy, this is generally done at room temperature in air. Of course, if the melt method is used and the gelling occurs in a matter of minutes, the composition will still be warm.

The neutralizing agent is usually a base such as gaseous ammonia or concentrated ammonium hydroxide. Also, ammonia dissolved in alcohol can be used. Also ethylene oxide or propylene oxide or ammonium carbonate or any agent which will neutralize the acid can be used alone or in combination.

If it is desired to wash the hydrogel with water, then azeotropic distillation or washing with a volatile, oxygen-containing water miscible organic solvent having a relatively low surface tension is desirable (adding water after the gel is formed does not harm the pore structure if it is removed gently). After drying of water in this manner (i.e. replacing the water with the organic liquid), the gel is preferably dried of solvent under mild conditions, for instance by heating at a temperature of 25° to about 150° C., most preferably under vacuum. Also, if the purpose is to make a catalyst, it is generally desirable to wash with a base after gellation, preferably ammonium hydroxide or a substituted ammonium hydroxide such as tetramethylammonium hydroxide. Generally, the base will be in water but it can be in an organic solvent. Thus, in this preferred sequence, the gel is washed with an aqueous base and then water removed with the normally liquid organic compound as previously described.

The resulting aluminum phosphate can be utilized as a filler in rubber or plastics, as a catalyst, or as a base for vanadium or chromium so as to produce a catalyst for olefin polymerization.

In the case of chromium, the chromium-containing xerogel must be activated in an oxidizing ambient. This can be carried out either by having chromium coprecipitated with the hydrogel or adding chromium to the hydrogel or adding an anhydrous solution of a chromium compound to the xerogel and thereafter heating in an oxidizing ambient such as air. The chromium or vanadium is present in an amount within the range of 0.001 to 10, preferably 0.1 to 5, more preferably about 1 weight percent based on the weight of the dried support. The activation of the thus formed xerogel can be carried out at a lower temperature than is generally required for activating silica-based chromium catalysts. Temperatures of 150°–800° C., preferably 300°–800° C., more preferably 300°–700° C., and times of 1 minute to 48 hours, preferably 0.5 to 10 hours are suitable. Alternatively, the activation can be carried out in any ambient under dry conditions and thereafter a zerovalent chromium, for instance $\pi$-bonded organochromium compounds such as dicumene chromium or dibenzene chromium, added anhydrously. Any ambient can also be used when the support is used to carry vanadium.

If the purpose is to produce a chromium catalyst support, the aluminum and phosphorus components are selected so as to give an atom ratio of phosphorus to aluminum within the range of 0.2:1 to 1:1, preferably 0.6:1 to 0.9:1. Broadly, however, any ratio, for instance from 0.1:1 to 2:1 can be used.

Vanadium can be combined with the support by coprecipitating a vanadium compound with the phosphate-containing support, by adding a vanadium compound to the support at the hydrogel stage, or by adding a vanadium compound anhydrously to the xerogel. Suitable vanadium compounds include ammonium vanadate, vanadyl sulfate, vanadium tribromide, vanadium di or trichloride, vanadium tri or pentafluoride, vanadyl dibromide and vanadyl tribromide, vanadyl trichloride or other water soluble vanadium compounds. Vanadium acetylacetonate and other hydrocarbon soluble vanadium compounds can be used to impregnate the xerogel.

The catalysts produced using the base prepared by the novel method of this invention containing a chromium or vanadium compound thereon can be used to polymerize at least one mono-1-olefin containing 2 to 8 carbon atoms per molecule, such as ethylene, propylene, 1-butene, 1-pentene, 1-hexene and 1-octene. Such catalysts are of particular applicability in producing ethylene homopolymers and copolymers of ethylene and one or more comonomers selected from 1-olefins containing 3 to 8 carbon atoms per molecule such as propylene, 1-butene, 1-pentene, 1-hexene and 1-octene. These polymers can be produced by solution polymerization, slurry polymerization, and gas phase polymerization using conventional equipment and contacting and processes. Contacting of the monomer or monomers with the catalyst can be effected by any manner known in the art of solid catalyst. One convenient method is to suspend the catalyst in an organic medium and to agitate the mixture to maintain the catalyst in suspension throughout the polymerization process. Typically, predominantly ethylene copolymers are prepared using 0.5–20 weight percent comonomer as described above in the feed, preferably sufficient comonomer to give 97 to 99.6 weight percent polymerized ethylene units in the resulting copolymer.

When the novel method of making a phosphate of this invention is used to make a phosphate for a catalyst base for a chromium or vanadium olefin polymerization catalyst, the resulting catalyst can be used in conjunction with a cocatalyst if desired. Suitable cocatalysts include organometal compounds primarily aluminum and boron alkyls. The most preferred boron compounds are trihydrocarbylboron compounds, particularly trialkylboron compounds, such as tri-n-butylborane, tripropylborane, and triethylborane (TEB). Suitable aluminum alkyls include $R_3Al$, $R_2AlX$, and $RAlX_2$ where R is a 1 to 12 carbon atom hydrocarbyl radical and X is a halogen preferably chlorine. Triethylaluminum and diethylaluminum chloride are particularly suitable.

EXAMPLE I

A melt of 1,230 grams of $Al(NO_3)_3.9H_2O$ plus 302 grams of $NH_4H_2PO_4$ and 75 grams $Cr(NO_3)_3.9H_2O$ (about 5 percent chromium in the final catalyst) plus 50 cm$^3$ water was made. The final volume after heating to melt to form a homogeneous syrup was 1,200 cm$^3$.

Of this 1,200 cm$^3$, a 200 cm$^3$ first aliquot was put into a blender and very slowly 70 cm$^3$ concentrated ammonium hydroxide was added. This is 56 percent of the theoretical 125 cm$^3$ needed for complete neutralization. The liquid got hot and was poured into a beaker and allowed to stand for 24 hours but did not gel.

A second 200 cm$^3$ aliquot of the melt was put into a blender as above and very slowly 80 cm$^3$ of concentrated ammonium hydroxide was added. After blending together the liquid is poured into a beaker. After 3 hours, it got thick. After 24 hours, it resembled jello. Eighty cm$^3$ is 64 percent of the theoretical amount needed for complete neutralization.

A third 200 cm$^3$ aliquot of the basic melt was put in a blender and very slowly (over 2 minutes) 85 cm$^3$ of concentrated ammonium hydroxide was added. The resulting liquid was poured out into a beaker. It turned into a hard gel in about 10 minutes at a pH of about 2.

A fourth 200 cm$^3$ aliquot of the basic melt was placed in a blender and very slowly 90 cm$^3$ of concentrated ammonium hydroxide was added. It gelled before it could be taken out of the blender. This represents 72 percent of the theoretical amount of neutralizing agent required for complete neutralization.

A fifth 200 cm$^3$ aliquot of the melt was placed in a blender with 50 cm$^3$ of water and 90 cm$^3$ of the ammonium hydroxide was slowly added. The solution got hot and was poured into a beaker. Nothing happened in 10 minutes. It was put back in the blender, another 5 cm$^3$ of ammonium hydroxide added and it got thick. It was poured into a beaker and gelled during the operation of pouring it into the beaker.

The liquid from the first aliquot to which 70 cm$^3$ of ammonium hydroxide were added and which had not gelled after 24 hours was put back in a blender and 10 cm$^3$ additional ammonium hydroxide added whereupon it gelled immediately in the blender. These runs demonstrate that about 56 percent neutralization is too little to effect gelation after a reasonable aging time and that about 72 percent is too much causing immediate gelation which would be, of course, under acid conditions which is believed in the prior art to be bad. These data further show that when about two-thirds (60 to 70 percent) of the amount of base needed for gellation is used, gelling will occur under acid conditions after a waiting period. These results also show that there is an interrelationship between the amount of dilution and the amount of base used with dilution tending to inhibit gelation and additional base, of course, tending to expedite it.

EXAMPLE II

A melt was made as in Example I and neutralized by slow addition with stirring of two-thirds of the ammonium hydroxide needed for complete neutralization. This made a solution with a pH of about 2 which was set aside to cool. Within an hour, it was hard. After about three hours, it was knocked out of the beaker as a hard brick. The next day, the brick was split into four pieces which were each crushed, washed and dried as follows:

A1: Washed with three volumes of hot water. The particles fell apart into a mush. It was then dried in a vacuum oven at 60° C.

A2: The same water wash was used as in A1 and then the gel was washed three times with acetone, and dried under a vacuum oven.

A3: The third aliquot was washed with three volumes of hot water to which had been added ammonium hydroxide to make a pH of 8 to 9 and was oven dried under vacuum at 60° C.

A4: This was treated in the same manner as A3 except it was washed three times with acetone before the oven drying.

All four samples were activated in air 5 hours at 700° C.

Ethylene was polymerized under particle form conditions in a stirred, stainless steel reactor of about 2 L capacity employing about 600 g of isobutane as diluent in each run with a catalyst charge ranging from about 0.03 to about 1.2 g, and in the presence of 1 mL of a hydrocarbon solution of triethylborane (TEB). The reactor and its contents were heated to the operating temperature of 205° F. (96° C.), ethylene was pressured in to give an ethylene pressure of about 550 psig and the run was started and continued for the time set out. Ethylene pressure was maintained during the run by supplying additional ethylene as required from a reservoir.

Each run was terminated by stopping ethylene flow and venting the gaseous contents to a flare line for disposal. The polymer was recovered, dried and weighed to determine catalyst productivity which is expressed in terms of grams polyethylene per gram catalyst for the time period set out.

The polymerization results were as follows:

| Sample | Polymerization Results | | | HLMI/MI[1] |
|--------|--------------|---------|-----|------------|
|        | Productivity | Time    | MI  |            |
| A1     | Trace        | 30 min. | —   | —          |
| A2     | 2,895        | 22 min. | .54 | 212        |
| A3     | 453          | 60      | —   | —          |
| A4     | 7,470        | 30      | .78 | 102        |
| A4     | 7,790        | 20      | —   | —          |
| A4     | 10,600       | 60      | .49 | 229        |

[1]MI is Melt Index determined by ASTM D1238-65T, Condition E and High Load Melt Index (HLMI) by Condition F.

As can be seen, the catalyst produced in accordance with this invention had the ability to produce polymer with exceptional productivity and good melt index. In addition, the rate of polymerization held constant during the runs, as evidenced by a constant rotameter reading for rate of ethylene addition, thus giving better overall activity than in a conventional chromium/AlPO$_4$ preparation.

While this invention has been described in detail for the purpose of illustration, it is not to be construed as limited thereby but is intended to cover all changes and modifications within the spirit and scope thereof.

We claim:

1. A polymerization process comprising:
   contacting at least one mono-1-olefin having 2 to 8 carbon atoms per molecule in a reaction zone under polymerization conditions with a catalyst produced by a process comprising:
   combining a source of aluminum ions with a source of phosphate ions in a concentrated mass, combining said concentrated mass with a neutralizing agent, said neutralizing agent being used in an amount insufficient to cause immediate gelation, aging until gelation occurs to form a hydrogel, removing water from said hydrogel to produce a xerogel, thereafter activating at an elevated temperature in an oxidizing ambient, and wherein 0.001 to 10 weight percent chromium or vanadium based on the weight of the xerogel is introduced prior to said activating; and
   recovering a polymer.

2. A method according to claim 1 wherein said at least one mono-1-olefin is selected from ethylene, propylene, 1-butene, 1-pentene, 1-hexene and 1-octene.

3. A method according to claim 1 wherein said at least one mono-1-olefin comprises ethylene.

4. A method according to claim 1 wherein an organometal cocatalyst is used in combination with said catalyst.

5. A method according to claim 1 wherein a trialkylborane cocatalyst is used in combination with said catalyst.

6. A method according to claim 1 wherein said polymer is an ethylene homopolymer or a copolymer having 97 to 99.6 weight percent polymerized ethylene units.

7. A method according to claim 1 wherein said catalyst contains chromium.

8. A method according to claim 1 wherein said hydrogel has a volume of 3 to 6 cm$^3$ per gram of aluminum phosphate.

9. A method according to claim 1 wherein said neutralizing agent is a base selected from ammonia or ammonium hydroxide.

10. A method according to claim 1 wherein said neutralizing agent is used in an amount to give a pH below 4.

11. A method according to claim 1 wherein said source of aluminum ions is hydrated aluminum nitrate.

12. A method according to claim 1 wherein said source of aluminum ions is an aluminum salt in the form of a syrup in water, the water being present in an amount within the range of 5 to 40 weight percent based on the weight of said aluminum salt.

13. A method according to claim 1 wherein said source of aluminum ions is an aluminum salt in the form of a melt.

14. A method according to claim 13 wherein no water is added to said concentrated mass.

15. A method according to claim 1 wherein said source of phosphate ions is monobasic ammonium phosphate.

16. A method according to claim 1 wherein said hydrogel forms in a time within the range of 5 minutes to 10 hours.

17. A method according to claim 16 wherein said source of aluminum ions is molten hydrated aluminum nitrate and 1 to 15 weight percent water based on the weight of the said hydrated ammonium nitrate is added to said concentrated mass.

* * * * *